(12) United States Patent
Prafullchandra et al.

(10) Patent No.: US 8,166,552 B2
(45) Date of Patent: Apr. 24, 2012

(54) ADAPTIVE CONFIGURATION MANAGEMENT SYSTEM

(75) Inventors: Hemma Prafullchandra, Mountain View, CA (US); Russell Weisz, Santa Cruz, CA (US); Renata Budko, Sunnyvale, CA (US); Eric Ming Chiu, Los Altos, CA (US); Boris Belov, Sunnyvale, CA (US)

(73) Assignee: Hytrust, Inc., Mountain View, CA (US)

( * ) Notice: Subject to any disclaimer, the term of this patent is extended or adjusted under 35 U.S.C. 154(b) by 190 days.

(21) Appl. No.: 12/355,584

(22) Filed: Jan. 16, 2009

(65) Prior Publication Data

US 2010/0070319 A1    Mar. 18, 2010

Related U.S. Application Data

(63) Continuation-in-part of application No. 12/210,084, filed on Sep. 12, 2008, now Pat. No. 8,065,714.

(51) Int. Cl.
*G06F 21/00* (2006.01)

(52) U.S. Cl. ......................................... 726/25

(58) Field of Classification Search ...................... 726/25
See application file for complete search history.

(56) References Cited

U.S. PATENT DOCUMENTS

| | | |
|---|---|---|
| 2002/0169987 A1 | 11/2002 | Meushaw et al. |
| 2004/0030913 A1* | 2/2004 | Liang et al. ............ 713/200 |
| 2005/0210467 A1 | 9/2005 | Zimmer et al. |
| 2005/0257267 A1* | 11/2005 | Williams et al. ............. 726/25 |
| 2006/0026688 A1 | 2/2006 | Shaha |
| 2006/0218267 A1* | 9/2006 | Khan et al. ................. 709/224 |
| 2007/0022480 A1 | 1/2007 | Newman |
| 2007/0067351 A1 | 3/2007 | Singh et al. |
| 2007/0073858 A1 | 3/2007 | Narayanan et al. |
| 2007/0118350 A1 | 5/2007 | Van Der Made |
| 2007/0261121 A1 | 11/2007 | Jacobson |
| 2008/0034408 A1 | 2/2008 | Duggal |
| 2008/0098309 A1 | 4/2008 | Fries et al. |
| 2008/0167920 A1* | 7/2008 | Schmidt et al. ............ 705/7 |

(Continued)

FOREIGN PATENT DOCUMENTS

KR    10-2007-0112755 A    11/2007

OTHER PUBLICATIONS

Charu Chaubal, VMware Infrastructure 3, Security Hardening, 2007, 19 pp, Palo Alto, USA.

(Continued)

*Primary Examiner* — Gilberto Barron, Jr.
*Assistant Examiner* — Cordelia Zecher
(74) *Attorney, Agent, or Firm* — SNR Denton US LLP

(57) ABSTRACT

An automated configuration management system (ACMS) oversees resources of a virtualized ecosystem by establishing a baseline configuration (including, e.g., security controls) for the resources; and, repeatedly, monitoring and collecting data from the resources, analyzing the data collected, making recommendations concerning configuration changes for the resources of the virtualized ecosystem based on the analysis, and either adopting and implementing the recommendations or not, wherein new states of the virtualized ecosystem and reactions to recommended changes are observed and applied in the form of new recommendations, and/or as adjustments to the baseline. The recommendations may be implemented automatically or only upon review by an administrator before being implemented or not. The various data may be analyzed according to benchmarks established for security and compliance criteria of the resources of the virtualized ecosystem, for example static/pre-defined or dynamically derived benchmarks/best practices.

34 Claims, 4 Drawing Sheets

U.S. PATENT DOCUMENTS

2008/0256538 A1    10/2008    Carter et al.

OTHER PUBLICATIONS

Michael Hilker, Next Challenges in Bringing Artificial Immune Systems to Production in Network Security, Bionetics 2007 Dec. 10-12, 2001, Budapest, Hungary, 7 pp.

VMware ESX Server 3.x Benchmark- Version 1.0, The Center for Internet Security, Oct. 2007, 70pp.

VMWARE, VMware Esx Server 3-Best Practices for VMWare ESX Server 3, VMware White Paper, Copyright 1998-2006, 13pp, Palo Alto, USA.

National Security Agency, VMware ESX Server 3 Configuration Guide, Enterprise Applications Division of the Systems and Network Analysis Center (SNAC)- Information Assurance Directorate, Mar. 3, 2008, 26 pp, Ft. Meade, USA.

Intel Technology Journal, Autonomic Computing, vol. 10, Issue 04, Published Nov. 9, 2006, 84 pp.

Hytrust, Inc. et al., PCT/US2009/051590 filed Jul. 23, 2009; International Search Report and Written Opinion; ISA/KR; Feb. 23, 2010; 7pp.

Hytrust, Inc. et al., PCT/US2009/051883 filed Jul. 27, 2009; International Search Report and Written Opinion; ISA/KR; Feb. 2, 2010; 9pp.

Hytrust, Inc. et al., PCT/US2009/051995 filed Jul. 28, 2009; International Search Report and Written Opinion; ISA/KR; Feb. 24, 2010; 11pp.

\* cited by examiner

ADAPTIVE CONFIGURATION MANAGEMENT SYSTEM

RELATED APPLICATION

This application is a Continuation-in-Part and claims the priority benefit of U.S. patent application Ser. No. 12/210,084, entitled "Methods and Systems for Securely Managing Virtualization Platform", filed 12 Sep. 2008 now U.S. Pat. No. 8,065,714, assigned to the assignee of the present invention and incorporated herein by reference.

FIELD OF THE INVENTION

The present invention relates to an adaptive configuration and security control management system for use in connection with virtualized ecosystems such as individual virtualization platforms and clusters of such platforms, and associated security control systems.

BACKGROUND

Virtualization is a term that has been coined to refer to the abstraction of computer resources. This includes abstraction of both hardware and software at multiple levels, from individual servers and clients to complete networks. In this latter instance, the term "virtual infrastructure" has been used to refer to abstracted resources of a computer network, inclusive of all the hardware and software.

While virtualization provides many benefits, it also poses several new security risks, including the potential for unauthorized access of resources or data, denial of service attacks through starving of resources, and "hyperjacking", in which hypervisors (software layers that abstract physical hardware resources from the virtual machines running thereon) are compromised. These and other risks demand that virtualized resources be placed under the control of stringent security facilities.

In the above-cited U.S. patent application Ser. No. 12/210,084 (the "'084 application), a control layer that securely manages the configurations of virtualization platforms was introduced. These configurations were based on published best practices and/or security hardening guidelines, such as the VMware Security Hardening Best Practice for VMware Infrastructure 3, CIS VMware ESX Server 3.x Benchmark, and the NSA VMware ESX Server 3 Configuration Guide. The assessments and remediations performed by the control layer were primarily based on these publications, however, administrators were still allowed to customize, and either make more stringent or relax how securely the deployed virtualization platforms were configured.

Thus, the configuration practices adopted in the '084 application relied on "static" knowledge; that is, knowledge derived from past experiences, mandates and recommendations of the administrators and other individuals. Although such a protocol provides substantial savings in terms of time, cost and consistency, the overall benefits are limited in that the protocol mirrors only what is already known. The virtualization platforms can be quickly and consistently configured to meet particular security and compliance requirements, as published in these benchmarks/best practices, but that is all. We call such a solution the "static knowledge configuration management system" or ARC.

A further related patent application, U.S. patent application Ser. No. 12/347,315, filed Dec. 31, 2008 (the "'315 application"), assigned to the assignee of the present invention and incorporated herein by reference, describes a security control system adapted to define and analyze object handling control information, for example, control information that may influence or impact security and compliance of a virtualized ecosystem and derive from it object properties for each of a number of logical resources involved in the execution of a virtual machine in any given context within the virtualized ecosystem. While ARC provides many beneficial methods and systems for managing virtualization platforms, the present inventors have determined that even greater benefits can be obtained through the use of an adaptive configuration and security control management system (ACMS) for a virtualized ecosystem such as that discussed in the '315 application. This ACMS is discussed in detail below.

SUMMARY OF THE INVENTION

In one embodiment, the present invention provides an automated configuration and security control management system (ACMS) for a virtualized ecosystem. Such a virtualized ecosystem may include a security control system as discussed in the '315 application. The ACMS may be instantiated as one or more modules (e.g., as part of a stand alone system or embodied in an existing system such as that discussed in the '084 application) configured to analyze data concerning security and compliance related criteria. The data may be collected from monitored resources of the virtualized ecosystem and the ACMS adapted to recommend configuration changes and/or security controls for the resources of the virtualized ecosystem according to results of the analysis. The ACMS may be further configured to automatically apply some or all of the recommended configuration changes and/or security controls.

The security and compliance related criteria on which the above-referenced analysis is based may include past behaviors of the resources of the virtualized ecosystem. The ACMS may also monitor rates of change in numbers of deployed resources of the virtualized ecosystem, rates of change in configurations of the resources of the virtualized ecosystem, rates of remediations of the resources of the virtualized ecosystem, rates of change in the security controls of the resources within virtualized ecosystem, and/or usage patterns of the resources of the virtualized ecosystem. Other aspects of the virtualized ecosystem and its resources may also be monitored. Once collected, the data concerning security and compliance criteria may be analyzed according to benchmarks/best practices established for said criteria. For example static/pre-defined benchmarks as instantiated by a control layer that securely manages the configurations of the resources of the virtualized ecosystem, and/or best practices that are dynamically derived (i.e., learned) from monitoring of the virtualized ecosystem and implementations (or rejections) of recommended configuration changes and/or accumulated information provided by a community of automated configuration and security control management systems deployed among various enterprises.

A further embodiment of the invention provides for automatically managing configuration and security controls of resources of a virtualized environment by establishing a baseline configuration (including, in some instances, security controls) for the resources of the virtualized environment; and, repeatedly, monitoring and collecting data from the resources, analyzing the data collected, making recommendations concerning configuration (including, e.g., security controls) changes for the resources of the virtualized environment based on the analysis, and either adopting and implementing the recommendations or not, wherein new states of the virtualized environment and reactions to recommended changes are observed and applied in the form of new recommendations and/or adjustments to the existing baseline. The recommendations may be implemented automatically or only upon review by an administrator before being implemented or not. The various data may be analyzed according to benchmarks/best practices established for security criteria of the resources of the virtualized environment for example the static/pre-defined or dynamically derived benchmarks/best practices described above.

In various embodiments of the invention, the monitoring may involve recording results of compliance-related operations, and/or capturing information concerning rates of each type of configuration and security control operation and any causal relationships between them, the scope and risk of each step associated with the operations, any dynamic usage patterns of the resources of the virtualized environment, and configuration (including, e.g., security control) changes that are initiated in response to the recommendations. Thereafter, the analysis may consider both individual and cumulative measurements in regard to expectations (e.g., expectations set by the benchmarks/best practices). The resulting recommendations may then take into consideration the risks associated with configuration changes for the resources in the virtualized ecosystem. Any learning based on the recommendations and implementations thereof may ultimately be shared with one or more ACMS.

In some cases, during cycles of the repeated monitoring, analyzing, making recommendations, and adopting of recommendations, feedback of intermediate results of one or more of the phases is provided to an immediately preceding one of the phases. The feedback may be used to provide additional adaptation of the ACMS to the security posture of the virtualized ecosystem. In addition, user input may be provided at one or more of the phases, for example to assessment of intermediate results and/or provide remediation and reversion of security control changes in the virtualized ecosystem. The user input may be used to create custom benchmarks/best practices for security postures for the virtualized ecosystem and such custom benchmarks/best practices can be profiled across multiple dimensions relevant to security and used as models to bring other resources into compliance.

These and other features and embodiments of the present invention are discussed further below.

BRIEF DESCRIPTION OF THE DRAWINGS

The present invention is illustrated by way of example, and not limitation, in the figures of the accompanying drawings in which.

DETAILED DESCRIPTION

Figure 1A:
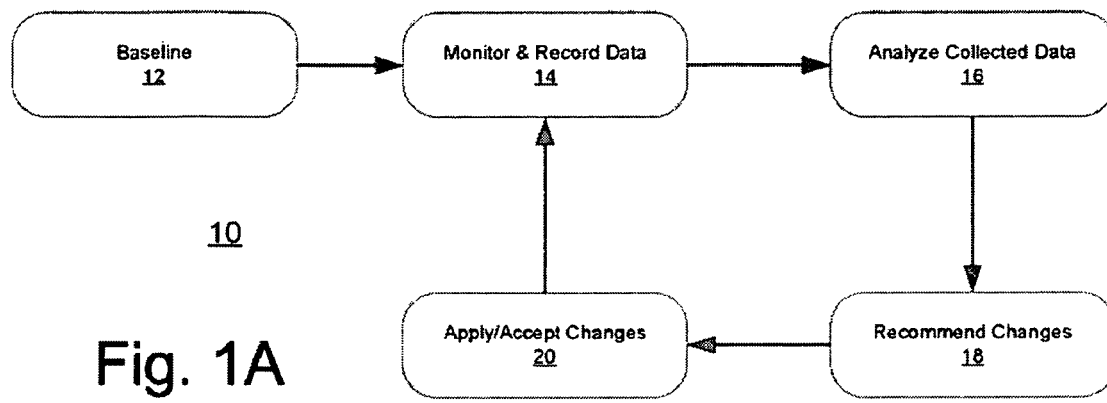
FIG. 1A illustrates the phases of an automated configuration and security control management solution consistent with an embodiment of the present inventions.

Described herein are methods and systems to provide dynamic configuration and security control management of resources of a virtualized ecosystem. The term virtualized ecosystem is meant to indicate a community of virtual objects (in which a single such virtual object may be the only member of the community), where each virtual object is a construct that represents an abstraction of some element of an underlying physical computer system or collection of other virtual objects. This dynamic approach to configuration and security control management may be based on a variety of factors, such as usage, behavior of ACMS and the protected virtualized ecosystem, and rate of change at a micro-level (e.g., a single virtualization platform) and/or a macro-level (e.g., clusters of deployed virtualization platforms) of the virtualized ecosystem. The approach also encompasses the ability of an ACMS to learn whether or not to recommend configuration (including security control) changes under different circumstances, based, for example, on the use of an ACMS, and, further, the ability to codify learned configuration management best practices, and externalize and share same with a community of ACMS users. The dynamic approach to configuration management may be applied to the configuration and other security and compliance control settings of virtual objects such as virtual machines, virtual storage and virtual networks.

In one embodiment consistent with the present invention, an ACMS is a self-learning system that, based on criteria such as past behaviors, rates of change, and resource usage patterns, proactively recommends or automatically changes configurations (including, e.g., security controls) of one or more deployed virtualization platforms on-the-fly to continuously meet or exceed specified security or compliance postures. The ACMS may be embodied as a module of a system for managing virtualization platforms as described in the '084 application, or may be a stand-alone system associated with one or more virtualization platforms. Various embodiments of the present invention may be implemented with the aid of computer-implemented processes or methods (a.k.a. programs or routines) that may be rendered in any computer-readable language and in any series of logical steps performed in a sequence to accomplish the stated purpose. The present invention can also be implemented with an apparatus to perform the operations described herein. This apparatus may be specially constructed for the required purposes, or it may comprise a virtualized environment as discussed above. Computer programs which instantiate embodiments of the invention may be stored in or on a tangible computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The ability to provide dynamic configuration and security control management of resources may be considered at either or both of two levels—micro and macro. At the micro level, a single virtualization platform (e.g., a VM Ware ESX Server, Microsoft Hyper-V platform, or other virtualization platform) is considered. At the macro level, both a set/cluster of homogeneous virtualization platforms, as well as a set/cluster of heterogeneous virtualization platforms are considered.

These views are logical (as opposed to physical) in nature and allow information collected through various monitoring and measurement instrumentation to be analyzed at various levels of grouping. Groupings may be made, for example, on the basis of type of virtualization platform, or by specific versions, or even other criteria such as security posture level. In some instances, groupings or classifications such as those described in the '315 application may be used. That is, resources of the virtualized ecosystem may be categorized so that resources with similar properties are grouped together, and a taxonomy of allowed hierarchical relationships of the groupings used to define higher groupings thereof. Likewise, groupings may be made according to similarities determined by defined metrics for resources within the virtualized ecosystem.

A number of instruments are developed to monitor and measure specific behaviors and characteristic for each level or visibility plane. The recorded results from the continuous monitoring and measuring are analyzed and reduced to specific, actionable configuration changes and/or security control settings. These configuration (including security control) change recommendations may be simply presented to an administrator or may be applied automatically by the ACMS. Once such changes are applied to the system under observation, the self-learning cycle continues.

A third or "cloud" level/visibility plane may also be considered, which view spans not only a given system's internal (from an enterprise point of view) virtual infrastructures but also those that are external. In this case, the monitoring and measurements are instrumented into the externally-hosted virtual infrastructures or, if these infrastructures already monitor and measure relevant information, then that data is normalized and provided to the ACMS. Any recommended configuration (including security control) changes may be applied by an internal administrator or an external administrator, depending on how the external virtual infrastructure is managed.

For each visibility plane the following characteristics may be monitored and/or measured for a single virtualization platform (in the case of the micro level) or a set of virtualization platforms that represent a particular classification (at the macro level):

1. Past behaviors and successes—characteristics that may be measured include security controls, compliance deviation, frequency of non-compliance, criticality of the virtualization platform in business terms, and so on.
2. Rate of change of the deployed virtualization platforms—this tracks the increase/decrease in number of platforms and/or virtualized resources deployed.
3. Dynamic resource usage—this tracks the usage of both physical system and virtualized resources (for example, processors, memory, storage, network, etc.) that may impact the security and compliance posture of the overall system.
4. Rate of remediation—the number, frequency, size (e.g., the number of files/resources modified), and the risk posed by the changes may be tracked. May also track the number of remediations that were "undone".
5. Rate of change—configuration changes for capacity, performance and the like that are typically normal growth changes but could easily impact the security and compliance posture of the system are tracked.

The classifications/groupings at the macro level may be pre-defined, and may include deployment/network classifications (e.g., clusters of virtualizations platforms in a quality assurance environment that do not require any specific compliance, versus those in a production environment which demand robust security postures) or a logical classification, for example, of a set of VMware ESX servers running version 3.5. Classifications may appear from the data collected and analyzed, for instance, the group of resources that have had the least number of changes, those resources that are the most stable, those resources with specific security control settings that achieved specified compliance, and so on; or may be dynamic/real-time classifications, such as those resources that are currently exceeding their normal workload, those virtualization platforms and/or higher virtual objects that may be in danger of exceeding their configured resources, etc. Some of these classifications may naturally be persisted, while others may remain purely dynamic and simply treated as a learning input for the ACMS, or treated as adjustments to the existing baseline.

ACMS Phases

FIG. 1A illustrates the phases of an automated configuration and security control management solution consistent with an embodiment of the present invention. As shown, the basic process 10 is one involving continual feedback. Given a certain baseline of configuration and/or security controls 12, the virtualized environment is monitored and the data from those monitoring operations collected (14) by the ACMS. The collected data from the monitoring operations is then analyzed (16), and based on this analysis the ACMS recommends configuration (including, e.g., security controls) changes (16). The recommendations are either adopted or not (e.g., either automatically or after review by an administrator), and, where appropriate, applied to the resources of the virtualized ecosystem (20). The cycle of monitoring, analyzing, recommending and applying changes repeats continually and as new states of the virtualized ecosystem and reactions to the recommended changes are observed, the ACMS "learns" and both adjusts what is normal behavior of the virtualized ecosystem, and applies those learnings to itself. This learning process and the application thereof to future configuration and security control change recommendations may be regarded as the dynamic development of "best practices" for the virtualized ecosystem.

As indicated above, the environment observed by the ACMS may include one or more virtualization platforms. Where more than one such platform is present, they may be homogeneous or heterogeneous in nature. In either case, the baseline configuration for the system may be established through the application of static knowledge by a configuration management system such as that discussed in the '084 application (i.e., ARC), to institute a best "known" security and compliance posture. Thereafter, the dynamic monitor/analyze/recommend change/apply change cycle of the ACMS may by used to evolve the baseline configurations (including, e.g., security controls) of the resources of the virtualized ecosystem in response to new threats and operator preferences/behaviors.

Two primary modes of operation for the ACMS exist—one that cycles through phases as described above, and another that can be thought of as an "observation" mode. In the observation mode, instead of automatically applying the recommended change(s), the ACMS may simply notify an administrator of configuration change recommendations, but continue cycling through the monitor/analyze/recommend phases even if the recommended changes are not applied. This action itself (i.e., the administrator's decision not to adopt a recommendation) could be noted as learning input and used as a basis for making (or not making) future recommendations. Other modes of operations may also be supported.

A. The Monitor/Measure and Record Data Phase—Each of the measurement activities described below generates one or more persistent records that contain contextual information (e.g., time, date, target resource, software versions, initiating events, user identity if applicable, etc.) useful for a comprehensive analysis of the configuration state of the protected virtualized ecosystem.

1. The results of all compliance-related operations such as assessment, remediation, reversion, etc. are monitored and recorded. These measurements also inherently capture the rate of each type of operation, and any causal relationship between them (assessment triggered remediation, reversion undid remediation, and so on). The scope and risk of each of the steps associated with the operations such as remediation is also captured. Accumulation of the compliance-related operation results across the virtualization platforms and over time is sufficient to derive the macro view of compliance status, including the rate of compliance changes.

2. Dynamic resource usage on the virtualization platforms is measured (e.g., on a regular schedule) frequently enough to construct an informative profile of the resources (both in use and in reserve) without inducing any significant load on the monitored virtualization platforms or resources. Resource monitoring can also be activated by specific events, such as remediation or configuration changes. Measurement techniques include remote execution of conventional or custom utilities, use of automated agents (e.g., daemon, SNMP, etc.) and other approaches. Accumulation of the dynamic resource usage across virtualization platforms and over time is sufficient to derive the macro view of resource usage, including the rate of usage changes, and can identify instances where current resource utilization is out of compliance with established guidelines and/or normal operating behavior. For example, such a usage conflict may occur when a virtual disk partition designated for log file storage is 91% full, thus exceeding a 10% reserve capacity requirement previously set by an administrator or in accordance with an industry benchmark/best practice. Specific resource usage measurements of interest include, for example:

a. Resource exhaustion situations and trends,
   b. Process mix conflicts with configured policy,
   c. Process resource limits or latency criteria exceeded,
   d. Disk allocations conflict with configured policy, and
   e. Network traffic conflicts with configured policy.

Note that these examples are not intended to be an exhaustive list of possible measurements that can be made. Data collected during the monitoring and measuring is recorded in the ACMS.

3. Configuration changes (e.g., to capacity, performance and the like that are in some instances within the normal operational parameters of the system being monitored but could easily impact the security and compliance posture thereof) that are initiated by ACMS or can be detected by ACMS are captured. For example, configuration changes such as the repartitioning of a physical disk to add a new logical disk may be captured because such a change may cause the monitored system to exceed the logical drive count permitted by the security policy in effect. These records will also inherently capture the rate of configuration changes. Measurements will capture each specific virtualization platform and/or resource added, removed or impacted by the reconfiguration. Accumulation of the configuration changes across virtualization platforms and over time is sufficient to derive the macro view of the deployment including the rate of configuration changes.

B. The Analysis Phase—Analysis is a goal-directed activity intended to determine if the micro and macro environments are operating within expected parameters and policies or not (in which case, triggering a corrective strategy rule or a change recommendation notification). Analysis considers both individual and cumulative measurements in regard to expectations. Appropriate filters are applied to individual measurements before making a decision that may trigger an action based on a single measurement. Measurement data is input to pattern and trend matching algorithms.

Figure 2:
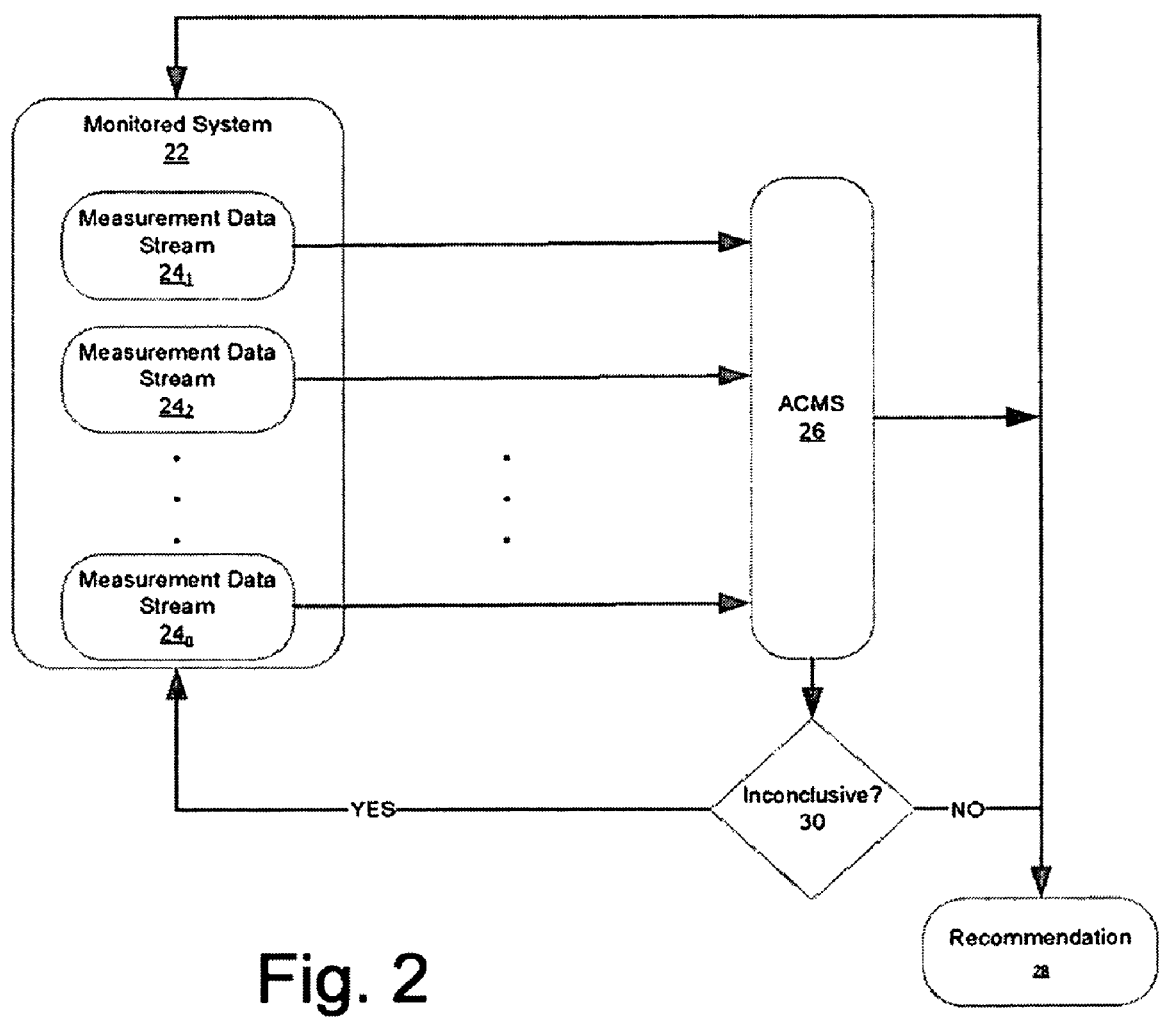
FIG. 2 illustrates the logical flow of information between a monitored system and an ACMS, in accordance with an embodiment of the present invention.

FIG. 2 shows the logical flow of information between a monitored system and an ACMS, in accordance with an embodiment of the present invention. The monitored system 22 may be instrumented in a variety of fashions, producing a number of measurement data streams $24_1$-$24_n$. The ACMS 26 (which is discussed in further detail below) receives the various data streams and compares the measured data from the monitored system with baseline values (or values associated with previously made configuration changes) for the instrumented criteria. Appropriate times for making measurements may be prompted by the ACMS or initiated by the administrator. If the ACMS finds unexpected deviations in the measurements from the current baseline, it may signal the administrator (e.g., to allow for a reasoned determination as to what to do with such measurements, such as allow adjustment to the current baseline) or ignore part of the measurement set. The criteria for actionable differences in analyzed patterns, trends or measurements from baseline values can either be provided by the administrator, ACMS default values or a combination of the two.

Any recommended changes 28 as a result of the ACMS analysis, if applied, may be folded into the ARC configuration templates described in the '084 application, or as security controls in the '315 application. If the recommendation is not applied then that information may be recorded so that, over time, the ACMS "learns" not to suggest such recommendations in the future. This behavior can be further tailored to meet the needs of the enterprise and/or the administrators. For example, when administrators decide not to apply a recommended configuration change, an option may be provided so that the administrators can indicate whether the ACMS should ignore similar conditions in the future for this particular situation or all similar situations, or simply ignore this one instance of the condition (in which case the ACMS can make a similar recommendation the next time a similar configuration change recommendation is triggered), and so on.

The analysis of compliance states, dynamic resource utilization and configuration changes on both the micro and macro levels follow similar processes. The analysis operates on individual measurements as well as measurement sets, and applies filters and/or pattern matching and trending algorithms to check for changes from current baseline configurations that exceed pre-set criteria. When found, these deviations trigger actionable rules. Of course, some differences between the micro and macro level views will exist for certain specific measurements of compliance results, dynamic resource utilization and/or configuration changes, as well as the criteria and rules that pertain to each. In a case where an analysis yields an inconclusive result (30) (e.g., in cases where patterns or trends from the measurements are considered probable but not conclusive), no configuration change recommendations are made. In such instances, measurement rates or mixes may be changed to better determine if an action should be taken without undue delay.

C. The Recommendation Phase—As noted above the ACMS may proactively recommend changes, or, alternatively, take action and notify the administrator when the results of an analysis exceed a predetermined criteria and trigger an actionable rule. The type of changes recommended by ACMS may include compliance actions such as remediation, micro or macro resource utilization changes, or configuration (including, e.g., security controls) changes.

For example, continuing with scenario involving the disk partition that reaches 91% of its capacity (such a situation triggering a configuration change recommendation), the ACMS may apply a low-pass smoothing filter to the disk capacity measurements, determine there is a regular upward trend in utilization for a particular disk partition, and notify the administrator of the trend before the 10% reserve limit is exceeded. In either case (i.e., whether a change recommendation is triggered by the reserve capacity being exceeded or by the recognition that it may soon be exceeded), the ACMS may recommend resizing the partition, changing log parameters, or removing one or more specific large files as a way to remediate the situation.

When changes are recommended, an administrator may authorize the ACMS to proceed with the recommended course of action, may decline the recommendation, or may proceed with an alternative course of action. In any of these situations, the ACMS will record the action taken and use that knowledge when making future recommendations (or taking future actions) in order to better advise or serve the administrator. Reasons why a particular action was taken may also be captured from the administrator as a profiling input. If the ACMS has been authorized to take direct action, it may do so using ARC and record such action. In either case, the ACMS may attempt to correlate all actions taken with future analyses to determine if the strategy was successful and use that knowledge as input to the actionable rule engine.

Figure 1B:
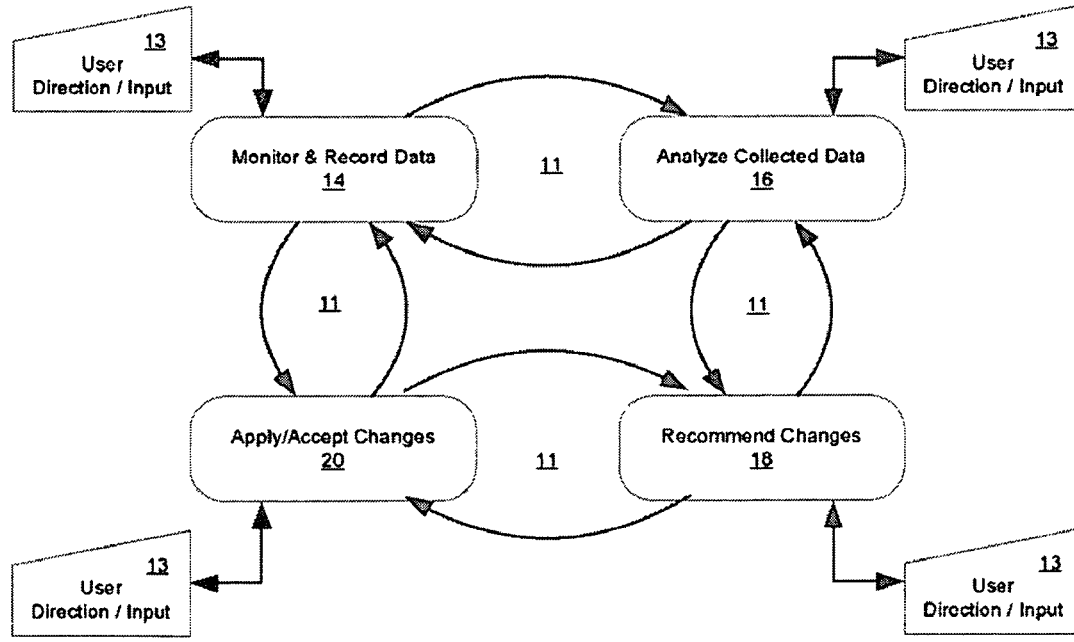
FIG. 1B illustrates an example of a learning cycle of an automated configuration and security control management solution involving mini-cycles and consistent with an embodiment of the present invention.

Turning briefly to FIG. 1B, an example of a cycle of an automated configuration and security control management solution involving mini-cycles and consistent with an embodiment of the present invention is shown. As was the case with the example shown in FIG. 1A, the ACMS processes information in a monitor/analyze/recommend/apply cycle, In this example, however, "mini-cycles" 11 between adjacent ones of these phases may be used to enable a deterministic outcome of a specific phase more efficiently, and to make the ACMS more adaptive to ongoing changes in the virtualized ecosystem.

These mini-cycles allow for feedback between adjacent phases, and one example of such a mini-cycle is the above-noted oscillation between the monitor and analysis phases until a recommendation is finally made based on a sufficient amount of accumulated information. Other such mini-cycles between any of the adjacent phases may also occur. Further, each phase may have associated user direction/input 13 to guide outcomes and/or to provide the input as part of the feedback process to an immediately preceding phase.

The user directed input in each phase may also be enabled to allow the ACMS to accomplish, optimize and learn specific behaviors to improve the overall security posture of the protected virtualized ecosystem. The ACMS may be configured to solicit user input when unexpected outcomes arise or when the obvious choice is unclear, for example, because every selection is equally weighted. The user direction/input may be given or solicited repeatedly, thus enabling interactive dialog between the user and the ACMS.

Applying ACMS Profiling Capabilities

Security related activities, such as assessment and remediation as detailed in the '084 application, and reversion (i.e., complete or partial undoing of a specific remediation change), which map to the ACMS phases may leverage the ACMS mini-cycles and user interactive mode to generate highly customized benchmarks. Customizations may be made:

1. to tailor a standard benchmark to a specific environment;
2. to combine operations from various standard or custom benchmarks to form a new custom benchmark; and/or
3. to optimize the operation(s) in a custom benchmark for any reason.

These customization are enabled via the user interactive mode and may be profiled by the ACMS across several dimensions (for example time, associated risk, associated risk indication, risk reduction coverage, purpose of the resources of the virtualized ecosystem, etc.) relevant to security.

ACMS Engine

Figure 3:
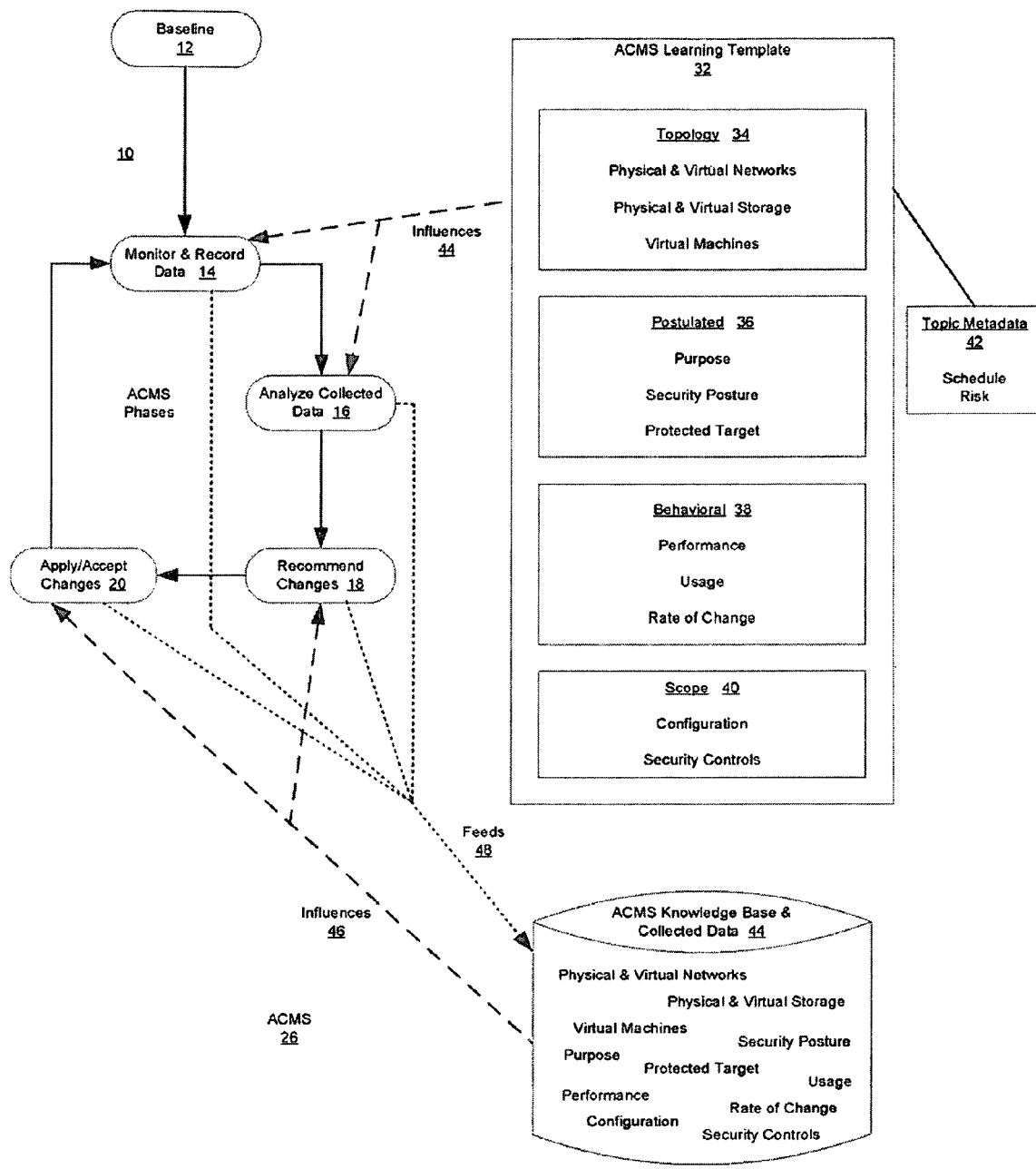
FIG. 3 illustrates components of an ACMS engine configured in accordance with an embodiment of the present invention.

Referring now to FIG. 3, ACMS 26 can be represented as an engine that cycles through the phases of process 10, discussed above, and the information learned as a result of such monitoring, analysis and recommendations. This learned information may be represented as "topics" and associated metadata. For example, a topic may be a set of "target resources" and the associated metadata may include the schedule on which assessments are performed, the results of those assessments, an overall measure of how compliant the target resources are, and so on. The types of topics the ACMS largely deals with generally fall into three categories, but other topics may also be supported:

1. Topology—relationship and properties data that change over time.
2. Postulated—requirements and policies data that are assumed and may be defined externally (and imported into) or within the ACMS.
3. Behavioral—data collected from/of the operating resources of the virtualized ecosystems.

The learned information may be discovered and imported from external systems, or instrumented and measured over time as discussed above. For example, the purpose of the virtualization platforms and their virtual machines may be for "quality assurance". This information may be discovered by the grouping and assigned name given in an external system, such as a VMware Virtual Center or an asset management system.

The illustration shows the relationship between the ACMS phases and the learned data. A learning template 32 captures the topics (e.g., topology topics 34, postulated topics 36, and behavioral topics 38) that are relevant to the resource(s) being managed (i.e., the scope 40 of the topics), and informed by metadata 42 for the topics. For example, if the scope of the topics is "configuration", then all related information in each of the topics (such as physical and virtual network, purpose, security posture, rate of change, and performance, etc.) is defined in the learning template. The learning template influences 44 the monitoring and analysis phases 14, 16, as shown.

In effect, the learning template 32 provides a flexible means of configuring the capabilities and behavior of the ACMS engine. For example, if a new topic, such as the risk associated with a particular operation, needs to be introduced then it is introduced as a new topic in the learning template and components for each phase are developed and added to the ACMS. Depending on the topic and its category, existing components may be leveraged. For example, if a new topic "security zone" (a postulated topic) is introduced, it may use the same components as the "purpose" topic.

The information collected in each of the ACMS phases is stored in an ACMS knowledge base 44, by topic. This collective information set influences 46 the recommendation phase 18, and may also influence the apply/accept changes phase 20. The knowledge base 44 receives information from the various phases through feeds 48, as shown and aggregates same with other learned information to inform the development of the learning templates 32.

Tuning ACMS Behavior Based on Risk

Most regulatory and industry compliance mandates or directives are directed to better managing and/or mitigating risks. Systemic and operational risks, which may include factors surrounding physical configuration, data protection, change management, personnel, architecture, vendor and processes are addressed. The present ACMS is likewise directed towards minimizing risks, for example the risks in the operation of a VMWare ESX host or the security control system described in the '315 application. In this regard, activities in each of the above-described phases may be tagged with a quantitative value of the risk of performing the subject activity and the risk reduction that results from implementing the recommended configuration change. For example, changing the protocol for an iSCSI device from unencrypted to encrypted is moderately risky due to the possibility of a change failure making the device inaccessible. However, if the change is successful then security is enhanced and a relative quantitative value can be assigned to that improvement. The individual performing the changes may also factor into the risk posed, for example, while that individual still has the authority to perform the change. If it is the first occasion for the individual to implement the subject configuration change, then a certain amount of risk may be present (and may be quantified) as a result of the individual's lack of familiarity with the system or the change process.

Hence, in one embodiment of the present invention the risk associated with various configuration change operations is quantified, a metric is developed and risk assignments are made to activities wherever feasible. Similarly, metrics may be developed for other aspects of an activity from the standpoint of the subject individual, architecture and/or vendors involved and the reliability of the physical systems.

The present ACMS may provide default risk values for various activities and such default values may be amended by an administrator. Regardless of the absolute values for particular activities, the ACMS uses the assigned risk values to guide its activities and its change recommendations. Activities that involve the minimal risk in terms of performance and that provide significant risk reduction value when successfully performed are given the highest priority. Conversely, activities that involve significant risk in terms of performance and that provide little risk reduction value when successfully performed are given the lowest priorities. This risk vs. reward calculation may be performed at each ACMS phase in order to arrive at recommendations for configuration changes/updates.

In some instances, the associated risk values may be presented along with the ACMS recommendations. This allows administrators to make informed decisions about whether and when to adopt the recommended changes. Likewise, for recommendations that have risk values below a certain threshold value, the ACMS may be configured to implement such recommendations without requiring additional administrator approval. The risk values may also be used as a factor in determining how much approval must be given by an administrator over how many recommend change cycles before the ACMS can modify its behavior.

Transferring Compliance Models

After one or more virtualization platforms and their associated virtual objects (such as a virtual machine, virtual network and/or virtual storage device or system) are in compliance, an administrator may want to use those platforms and/or objects as models for bringing another set of virtualization platforms and virtual objects into compliance. The ACMS facilitates this process in several ways. As indicated above, the ACMS records a baseline configuration of the model virtualization platform(s)/virtual object(s) and the changes made to these resources over time. The cumulative changes are potentially applicable to bring the new target virtualization platform(s)/virtual object(s) into compliance. The degree of applicability depends on the similarity between the compliant model and target. Similarity may be based on several factors including, for example:

1. the compliance mandate/directive,
2. the virtualization platform/virtual object topology,
3. configuration settings, such as security controls, files, services and protocols, and
4. the purpose or use of the model and target.

Thus, using the accumulated information regarding the configuration state of the model, together with any information provided by the administrator, the ACMS can construct a multi-factor profile for the model. This profile may be regarded as the model configuration profile which the administrator wants to impress onto the target. The targets' current profile can be obtained by the ACMS through the same sort of monitoring used with the model system and the two profiles compared to determine differences therebetween. For example, the ACMS may compare the two profiles, determine a multi-factor similarity between the profiles and use this information, along with any other assessment results, as inputs in order to generate a transfer action plan to bring the target into compliance. Cogent details of the action plan may be presented to the administrator as part of the recommend change phase to allow the administrator a certain degree of oversight of the process.

The ACMS can provide different degrees of compliance model transfer. A more complete degree of transfer could involve target configuration and even topology changes that go beyond normal benchmark remediations. A highly constrained transfer could include only a subset of benchmark remediations. The ACMS may also modify its action plan and recommendations based on the amount of information it has collected about the model and target. After some remediation is performed on the target, for example, a revised action plan may be formulated for further compliance model transfers.

Codifying and Sharing Learned Knowledge

The process by which best practices and guidelines are established can be lengthy, often spanning 12-18 months or more. Often, an initial set of elements presented as best practices are proposed by a small team, and those recommendations are reviewed and ratified by a larger community. A similar procedure can be applied for externalizing the learned knowledge of a community of ACMS installations, in a fully-automated fashion.

Figure 4:
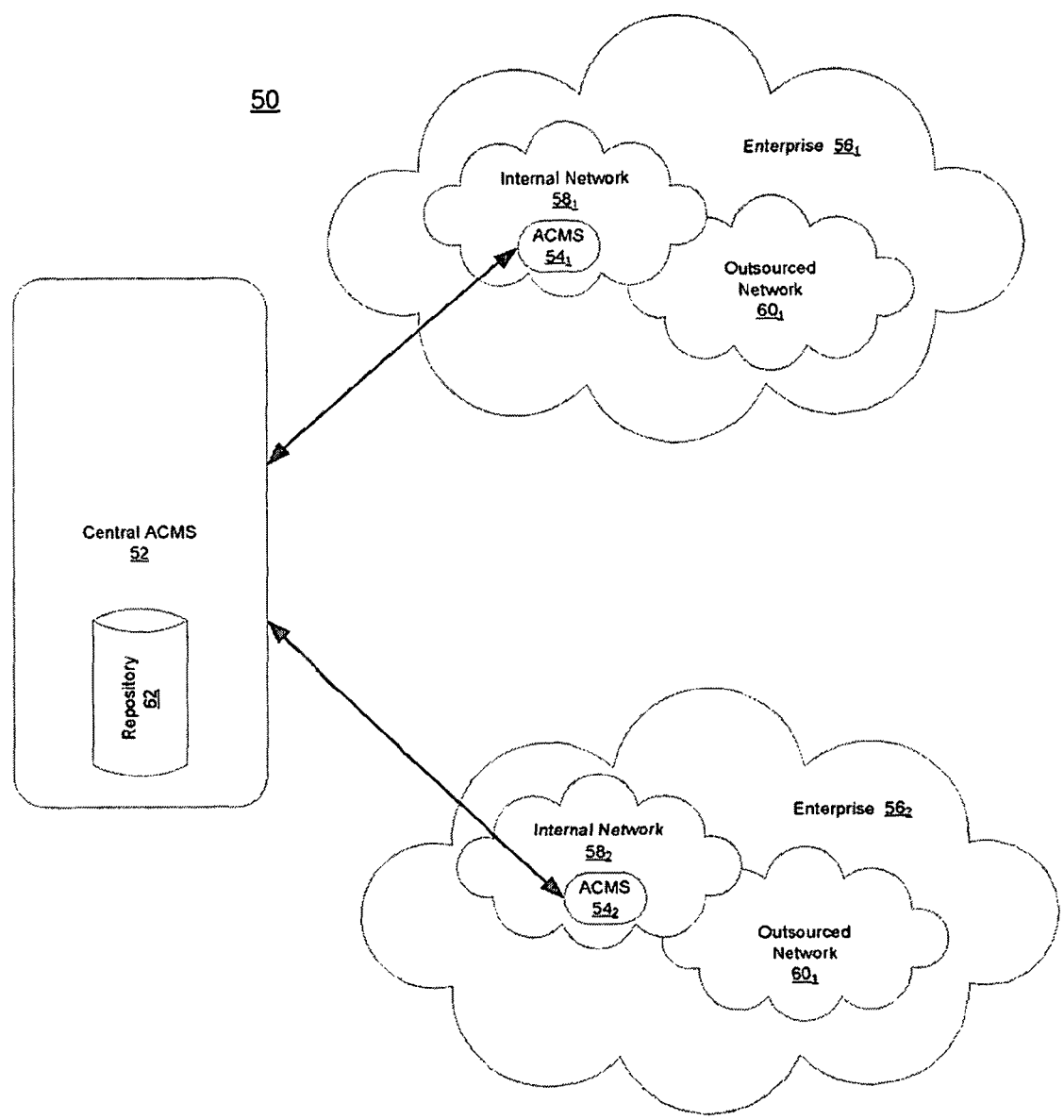
FIG. 4 illustrates an example of a central ACMS and an associated information repository configured to act as an information source for shared best practices among multiple ACMS installations, in accordance with an embodiment of the present invention.

Refer to FIG. 4, which shows a system 50 having a central ACMS 52 configured to receive inputs from remote ACMS installations $54_1$, $54_2$, at various enterprises $56_1$, $56_2$. Each enterprise has deployed its respective ACMS across both internal $58_1$, $58_2$ and outsourced $60_1$, $60_2$ environments, but this is only an example. In practice, many other variants of installations may be used. As each of the installed ACMS $36_1$, $36_2$ operate within their own environments, each will develop a series of their own best practices through the learned behavior and response mechanisms discussed above.

Periodically, each of the individual ACMS $54_1$, $54_2$ may share their learned knowledge with other ACMS installations. Thus, over time, a set of best practice information from multiple ACMS installations may be developed and "codified", for example within a central repository 62, maintained by the central ACMS 52. The sharing of information may be directly between ACMS installations, or, as shown in the diagram, between individual ACMS installations $54_1$, $54_2$ and the central ACMS 52. Such a system may be regarded as a centrally hosted ACMS repository in the "cloud".

The "cloud" data center may be managed by the ACMS vendor (or other trusted party) and the information in the central repository shared across all (or all participating) ACMS users. The set of information externalized by the remote ACMS installations $54_1$, $54_2$ may include patterns, trends and specific change recommendations, which can then be normalized across all the reporting enterprises to derive those patterns, trends and change recommendations that are popular across installations. This set of normalized data may become a de-facto best practice and may then be shared by the central ACMS with the individual remote ACMS installations. Such an operation creates a "network effect" of the most important change recommendations, trending and pattern identification that can be leveraged by all ACMS users.

The present system may also be adapted for sharing best practices of security controls discussed in the '315 application. For example, a virtual machine or cluster of virtual machines and its associated host may have a set of security controls defined to meet certain compliance criteria. After a certain period of time, a local ACMS, having successful achieved and maintained compliance, may decide to share that set of security controls and their values with the community. Similarly, other controls associated with industry or regulatory compliance mandates (e.g., the Health Insurance Portability Accountability and Act, the Sarbanes-Oxley Act, the Gramm-Leach-Bliley Act, etc.) may be defined by specific deployment instances of the ACMS, and those individual instantiations may be leveraged by a broader ACMS user community when "codified" and shared. Similarly, if a vulnerability and its associated patch was identified and applied by one deployed instance of an ACMS, that learning could be shared with the community of ACMS users.

Adaptive Configuration and Control Management of Virtual Objects

The ACMS may monitor, analyze and recommend changes for virtualization platforms and also for other virtual objects such as virtual machines, virtual networks and virtual storage, basically any virtual object that has associated configuration settings (including security controls). No distinction has been made between the virtualization platform and a virtual object in the above discussion and it is important to clarify that ACMS is not limited to a subset of the complete virtual domain. Examples in the above described phases describe virtual disk partition measurement, trend analysis and capacity warning recommendations. The present ACMS can provide the same support for storage assigned to the virtualization platforms and to the virtual machines.

Similarly, the present ACMS monitors, analyzes and recommends changes for a process mix that conflicts with configured policy or situation, when the process resource limits or latency criteria are exceeded. This applies to either the virtualization platform or a virtual machine. Policy and criteria are made available and can be configured for each of the supported virtualization platform and virtual machine operating systems. It is important to note that different virtual machine operating systems (such as Windows and Linux) may require significantly different policies and criteria.

The ACMS secures both the virtualization platform and virtual network in each phase similarly to the storage and machine approaches. For example, it remediates and closes unnecessary ports opened either by the virtualization platform or configured on a virtual switch for use by a virtual machine. As described above, the ACMS will remediate the protocol to networked devices to increase security. This reduces risk for both the virtualization platform and its virtual machines.

Thus, methods and systems to provide dynamic configuration management of resources of a virtualized ecosystem have been described. Those portions of the above description that were presented in terms of algorithms and symbolic representations of operations on data within a computer memory were so presented because these are the means used by those skilled in the computer science arts to most effectively convey the substance of their work to others skilled in the art. Such algorithms are, generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. The examples presented above are not intended to limit the scope of the invention, which should be measured only in terms of the claims, which follow.

What is claimed is:

1. An automated configuration management system (ACMS) for a virtualized ecosystem, comprising an electronic computing device and one or more computer-executable modules stored on one or more non-transitory computer-readable storage media accessible to said electronic computing device, said modules, when executed by said electronic computing device, configured to cause said electronic computing device to:

monitor and record results of compliance-related operations across resources of the virtualized ecosystem, measure dynamic utilization of the resources of the virtualized ecosystem frequently enough to construct informative profiles of the resources, and capture configuration change information associated with the resources of the virtualized ecosystem, analyze data recorded during monitoring of the compliance-related operations, measurement of the dynamic resource utilization and capture of the configuration change information concerning security and compliance criteria of the resources of the virtualized ecosystem, recommend, according to a desired risk profile and results of said analysis, utilization and configuration changes for the resources of the virtualized ecosystem, wherein the configuration changes include security control changes to achieve compliance goals, and said change recommendations are presented along with risk values associated with a risk of performing a recommended change and a risk reduction value of said recommended change, develop a series of best practices for compliance-related operations and dynamic resource utilization within the virtualized ecosystem through said monitoring and analysis, and share information regarding said best practices with other ACMS installations.

2. The ACMS of claim 1, wherein the ACMS is further configured to automatically implement some or all of the recommended configuration changes.

3. The ACMS of claim 1, wherein the security and compliance criteria include past behaviors of the resources of the virtualized ecosystem.

4. The ACMS of claim 1, wherein the ACMS monitors some or all of the following: rates of change in numbers of deployed resources of the virtualized ecosystem, rates of change in configurations and security controls of the resources of the virtualized ecosystem, rates of remediations of the resources of the virtualized ecosystem, and usage patterns of the resources of the virtualized ecosystem.

5. The ACMS of claim 1, wherein the data concerning security and compliance criteria of the resources of the virtualized ecosystem is analyzed according to those of the best practices established for said criteria.

6. The ACMS of claim 5, wherein the data is analyzed according to pattern and trend matching algorithms.

7. The ACMS of claim 5, wherein the best practices established for said criteria are static as instantiated by a control layer that securely manages the configurations of the resources of the virtualized ecosystem.

8. The ACMS of claim 5, wherein the best practices established for said criteria include practices learned from information accumulated by the ACMS while operating in the virtualized ecosystem.

9. The ACMS of claim 5, wherein the best practices for said criteria include practices learned from accumulated information provided by other configuration management systems deployed among various enterprises.

10. A method of automatically managing configuration and security controls of resources of a virtualized ecosystem, comprising:

establishing a baseline configuration for the resources of the virtualized ecosystem, the baseline configuration including security control settings;

repeatedly, monitoring and recording results of compliance-related operations across the resources of the virtualized ecosystem, measuring dynamic utilization of the resources of the virtualized ecosystem frequently enough to construct informative profiles of the resources, and capturing configuration change information associated with the resources of the virtualized ecosystem, analyzing data recorded during monitoring of the compliance-related operations, measurement of the dynamic resource utilization and capture of the configuration change information concerning security and compliance criteria of the resources of the virtualized ecosystem, making, according to a desired risk profile and results of said analysis, recommendations concerning utilization and configuration changes for the resources of the virtualized ecosystem, the configuration changes including security control changes to achieve compliance goals and said recommendations taking into account risk values associated with a risk of performing a recommended change and a risk reduction value of said recommended change, and either adopting and implementing the recommendations or not, wherein new states of the virtualized ecosystem and reactions to recommended changes are observed and applied in the form of new recommendations and/or as adjustments to an existing baseline;

developing a series of best practices for compliance-related operations and dynamic resource utilization within the virtualized ecosystem through said monitoring, recording and analyzing; and sharing information regarding said best practices for consideration with like information regarding other virtualized ecosystems.

11. The method of claim 10, wherein the recommendations are implemented automatically.

12. The method of claim 10, wherein the recommendations and associated risk values are reviewed by an administrator before being implemented or not.

13. The method of claim 10, wherein the data is analyzed according to those of the best practices established for security and compliance criteria of the resources of the virtualized ecosystem.

14. The method of claim 13, wherein the best practices for said criteria are static as instantiated by a control layer that securely manages the configurations of the resources of the virtualized ecosystem.

15. The method of claim 13, wherein the managing of the configuration and security controls is performed by a security control system adapted to define and analyze object handling control information that influences security and compliance of the virtualized ecosystem.

16. The method of claim 13, wherein the best practices for said criteria include practices learned from information accumulated while operating in the virtualized ecosystem.

17. The method of claim 13, wherein the best practices for said criteria include practices dynamically derived from accumulated information provided by a community of automated configuration management systems deployed among various enterprises.

18. The method of claim 10, wherein monitoring includes recording results of security- and compliance-related operations in a secure, efficient, compact and persistent manner.

19. The method of claim 18, wherein monitoring further includes capturing information concerning rates of each type of operation and any causal relationships between them.

20. The method of claim 18, wherein monitoring includes capturing information concerning scope and risk of each step associated with the operations.

21. The method of claim 10, wherein monitoring includes capturing information concerning configuration changes that are initiated in response to the recommendations.

22. The method of claim 10, wherein the analysis considers both individual and cumulative measurements in regard to expectations.

23. The method of claim 10, wherein the analysis considers a mix of measured data from the virtualized ecosystem.

24. The method of claim 10, wherein the analysis is based on classification at one or more visualization planes.

25. The method of claim 10, wherein the analysis observes and leverages any hierarchical relationships of the monitored resources.

26. The method of claim 10, wherein the analysis is performed using some or all of the following: pattern matching algorithms, trend analysis algorithms, or filtering of data.

27. The method of claim 10, wherein the recommendations account for risks associated with configuration changes for the resources.

28. The method of claim 27, wherein learnings based on the recommendations and any implementations thereof are shared with one or more automated configuration management systems.

29. The method of claim 10, wherein during cycles of the repeated monitoring, analyzing, making recommendations, and adopting of recommendations, feedback of intermediate results of one or more of these phases is provided to an immediately preceding one of the phases.

30. The method of claim 29, wherein user input is provided at one or more of the phases to improve a security posture of the virtualized ecosystem.

31. The method of claim 30, wherein the user input provides specific assessment, remediation and reversion guidance.

32. The method of claim 31, wherein the guidance includes assessment, remediation and reversion operation-specific parameters, which are made available during the automated management of configuration and security controls of the resources of the virtualized ecosystem.

33. The method of claim 30, wherein the user input is used to create custom best practices/benchmarks for different security postures for the virtualized ecosystem.

34. The method of claim 33, wherein the custom best practices/benchmarks are profiled across multiple dimensions relevant to security and used as models to bring other resources in the virtualized ecosystem into compliance.

* * * * *